United States Patent
Nishimura et al.

(10) Patent No.: US 7,423,942 B2
(45) Date of Patent: Sep. 9, 2008

(54) OPTICAL DISC DEVICE FOR RECORDING DIFFERENT TYPES OF OPTICAL DISCS AND DATA RECORDING METHOD FOR OPTICAL DISC DEVICE

(75) Inventors: Hajime Nishimura, Tokyo (JP); Jin Gohshi, Tokyo (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 495 days.

(21) Appl. No.: 10/803,454

(22) Filed: Mar. 17, 2004

(65) Prior Publication Data
US 2005/0030859 A1    Feb. 10, 2005

(30) Foreign Application Priority Data
Aug. 8, 2003    (JP)    ............... 2003-206750

(51) Int. Cl.
G11B 7/00    (2006.01)

(52) U.S. Cl. ............... 369/47.39; 369/47.44; 369/53.18

(58) Field of Classification Search ............ 369/53.18, 369/47.39, 47.44
See application file for complete search history.

(56) References Cited

U.S. PATENT DOCUMENTS

| | | | | |
|---|---|---|---|---|
| 5,311,494 A | * | 5/1994 | Sugita et al. ............... | 369/100 |
| 5,561,644 A | * | 10/1996 | Kondo ............... | 369/47.4 |
| 6,229,275 B1 | * | 5/2001 | Yamamoto ............... | 318/471 |
| 6,738,330 B2 | * | 5/2004 | Shumura et al. ............ | 369/53.18 |
| 2002/0006084 A1 | * | 1/2002 | Kawashima et al. ....... | 369/30.1 |

FOREIGN PATENT DOCUMENTS

| | | |
|---|---|---|
| JP | 01-196733 A | 8/1989 |
| JP | 2000-090563 | 3/2000 |
| JP | 2001-034962 | 2/2001 |
| JP | 2001-202689 | 7/2001 |
| JP | 2002-056558 | 2/2002 |
| JP | 2002-163854 | 6/2002 |
| JP | 2002-251735 | 9/2002 |
| JP | 2002-272172 | 9/2002 |

* cited by examiner

Primary Examiner—Wayne Young
Assistant Examiner—LaTanya Bibbins
(74) Attorney, Agent, or Firm—Townsend and Townsend and Crew LLP

(57) ABSTRACT

In an optical disc device comprising: a pickup 3 having a laser diode and generating a laser beam for recording onto an optical disc 1; a disc motor 2 that drives the rotation of an optical disc mounted thereon; a stepping motor that moves the pickup in the radial direction of the disc; and a system controller 6 that supplies drive current to the laser diode, and that controls the rotational speed of the disc motor and the position of the pickup by means of the stepping motor; the pickup has a temperature sensor 31 in its interior and system controller 6 restricts the drive current supplied to the laser diode in accordance with a detected temperature during data recording and controls the rotational speed of the disc motor, based on the detected temperature and the data recording properties of the optical disc which have been determined.

10 Claims, 7 Drawing Sheets

| Disc | Sesor output (temperature) T0 | | |
|---|---|---|---|
| | Not more than 30° | Not more than 40° | 40° or more |
| A | x24 | x16 | x10 |
| B | x24 | x24 | x16 |
| C | x24 | x16 | x16 |

OPTICAL DISC DEVICE FOR RECORDING DIFFERENT TYPES OF OPTICAL DISCS AND DATA RECORDING METHOD FOR OPTICAL DISC DEVICE

BACKGROUND OF THE INVENTION

1. Field of the Invention

The present invention relates to an optical disc device that is capable of recording or reproducing data by directing a laser beam onto an optical disc, and particularly relates to an optical disc device that is capable of recording high-quality data regardless of temperature changes in the environment of use, and to a recording method for an optical disc device.

2. Description of the Related Art

In recent years, the recording speeds used in optical discs as information storage media capable of data recording have increased, for example, a CD-R (compact disc-recordable) or a CD-RW (compact disc-rewritable). With increasing recording speeds, the devices that reproduce or record data from an optical disc have recording/reproduction systems using a rotary drive system of the ZCLV (zone constant linear velocity) type or CAV (constant angular velocity) type, facilitating control of rotation. In particular, the rotary drive of an optical disc with a CAV system in which the linear density is fixed, as with a CD-R or CD-RW, the need to increase the optical disc speed may be more acute, since it is necessary to increase the linear speed with the increase in the track radius on the disc.

On the other hand, with the increasing popularity of miniature computers typified by notebook personal computers, the optical disc devices that are mounted in such devices are becoming thinner. This means that the various components are arranged more densely within the device, making it difficult to ensure sufficient space for obtaining air convection in the interior of the device to achieve cooling. Specifically, the heat generated in the drive LSI and other components on the circuit board for controlling the emission of laser light and the drive current thereof is confined within the interior of the optical disc device, and, in particular, to perform data recording, high laser power is required, causing a high temperature in the interior.

With increases in speed of optical discs, in particular in optical disc devices capable of recording data, a further increase in the power of the laser beam is required when recording. However, in semiconductor lasers such as laser diodes that are normally employed as laser beam sources, the laser output is limited. If an attempt is made to output a laser beam with more than the rated power, there is a risk of damaging the semiconductor laser itself. In addition, the laser output varies with the ambient temperature of the semiconductor laser, so a prescribed laser output is ensured by monitoring part of the laser output. The laser output is particularly reduced in a high-temperature environment, thus the drive current of the semiconductor laser must be increased.

If an attempt is made to guarantee laser output by increasing the drive current, excessive drive current may flow, damaging the semiconductor laser. It should be noted that this phenomenon is particularly severe in the case of optical disc devices which are themselves not very thick, as described above. A prior art technique for obtaining stable recording quality by optimal laser power control, taking into account the temperature dependence of laser power described above, is described in Japanese Laid-open Patent Application No. 2002-251735. Specifically, in this prior art optical disc recording device, temperature detection means is provided to detect the ambient temperature, particularly the temperature of the substrate where the main ICs in the device are mounted. A correction means is provided that corrects the laser power from the laser diode in response to the signal from this temperature detection means.

Japanese Laid-open Patent Application No. 2001-34962 or Laid-open Patent Application No. 2000-90563 also discloses an optical disc device wherein an actuator that supports/drives an object lens is employed at the maximum limit of its capability, but to prevent burn-out of the drive coil that drives the actuator, the temperature of the drive coil is monitored using a heat transmission model of the actuator. The actuator is shut down in accordance with the results of this monitoring process if the rotational speed of the optical disc drops.

In addition, a device wherein, to lower the internal temperature of a recording media drive device at high temperature, a temperature sensor is provided in the interior of the recording media drive device. The sensor outputs a temperature signal, and the maximum rotational speed of the spindle motor for driving the optical disc is controlled in accordance with the temperature. See Japanese Laid-open Patent Application No. 2001-202689.

Further, from Japanese Laid-open Patent Application No. 2002-56558, a recording/reproduction device for a magneto-optic disc capable of recording a signal on a disc by means of a laser beam emitted from the optical head is known. In this system, the laser output of the optical head and the rotational speed of the spindle motor are controlled in accordance with the temperature obtained by providing a temperature detection element for monitoring the temperature within this device.

Japanese Laid-open Patent Application No. 2002-163854 discloses prevention of excessive rise in temperature of a component arranged in the interior of a disc device, caused by a fault or spurious operation of this device, by controlling disc rotation means in accordance with the change in temperature within the disc device.

Japanese Laid-open Patent Application No. 2002-272172 discloses detection of abnormality of a spindle motor of a disc recording device by periodically sampling the ambient temperature detected by a temperature sensor and comparison with a temperature table.

BRIEF SUMMARY OF THE INVENTION

In the prior art described above, in view of the temperature dependence of laser power, optimal laser power control is achieved by temperature detection within a device, and in combination therewith the rotational speed of the spindle motor (disc motor) that drives the optical disc on which the data is recorded is controlled. However, there has been a problem that stable recording quality could not necessarily be obtained simply by means of the above.

In particular, in the case of an optical disc of attenuated thickness as described above, in view of the tendency of the interior thereof to reach a high temperature, in addition to performing optimal laser power control by detection of the internal temperature, it becomes necessary to also perform optimal control of the rotational speed of the disc motor that drives the optical disc on which the data is recorded. However, in the prior art described above, the rotational speed of this disc motor is uniquely set solely in accordance with the detected internal temperature, so stable recording quality cannot necessarily be reliably obtained.

The present invention provides an optical disc device wherein the rotational speed of the disc motor can be optimally set so as to enable more stable recording quality to be obtained with various types of optical discs. It should be noted that the laser power required for data recording on optical discs that are recordable with an optical disc device depends not only on the recording medium type, for example, CD-R or CD-RW, but also on the material used to form the recording surface of such media and on the manufacturing steps thereof. The present invention also sets the laser power required for recording or rewriting recording not only in accordance with the type of optical disc, but also in accordance with, for example, information regarding the disc manufacturer.

In one embodiment, an optical disc is driven in rotation; data is recorded by directing a laser beam onto the optical disc by means of a semiconductor laser; the temperature in the interior of the disc device is detected; the drive current of the semiconductor laser is controlled in accordance with the detected temperature; the data recording properties of the optical disc are determined; and the rotational speed of the optical disc is set in accordance with the detected temperature and the data recording properties of the optical disc.

In this implementation, in an optical disc device as described above, the controller may have a table with the detected temperature and disc properties as parameters for setting the write speed to the optical disc. The optical device may suitably be applied to an optical disc with a dimension in the thickness direction of no more than 10 mm. The data recording properties of the optical disc include at least one of the following: type of optical disc, information relating to the manufacturer of the optical disc, information relating to the laser power required for recording, and information relating to the rotational speed of the optical disc.

According to the present invention, in view of the temperature dependence of laser power, optimal laser power control is performed by temperature detection within the device, and in combination therewith the rotational speed of the disc motor that drives the optical disc on which the data is recorded is controlled; in addition, the data recording speed is controlled in view not only of the type of disc but also its properties, so stable recording quality can always be obtained even for different types of optical discs.

DETAILED DESCRIPTION OF THE INVENTION

An embodiment of the present invention is described in detail below with reference to the attached drawings.

Figure 2:
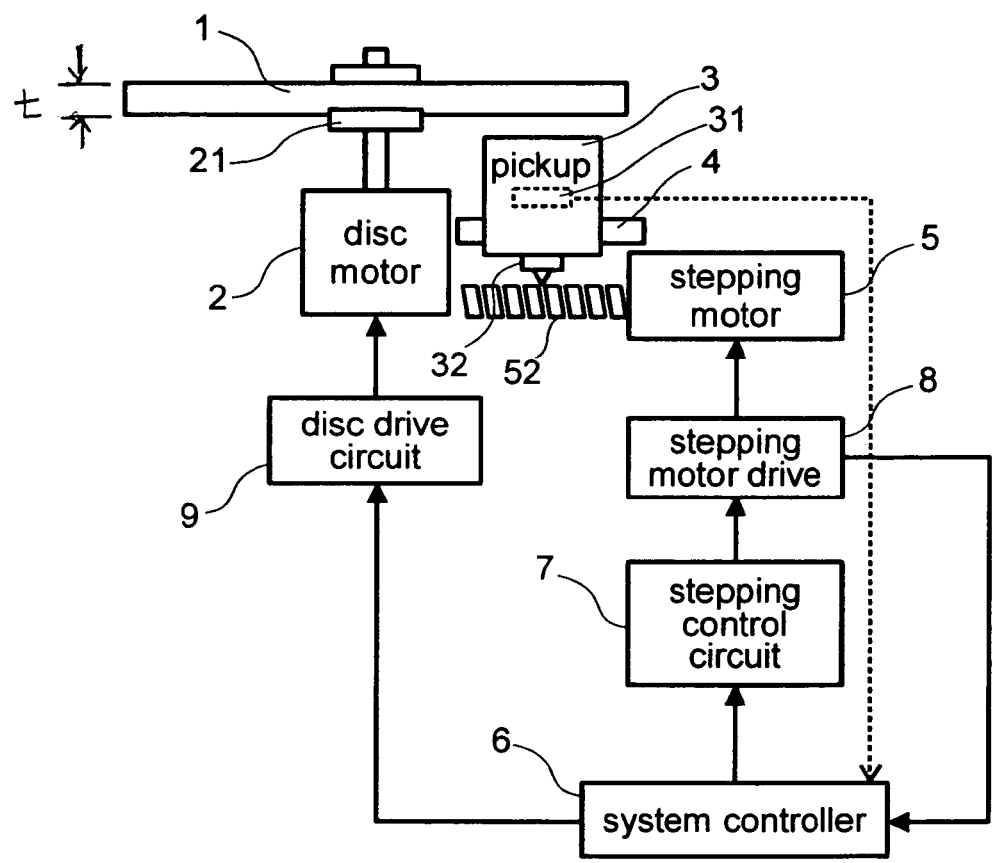
FIG. 2 is a block diagram showing the layout of an optical disc device according to an embodiment of the present invention.

FIG. 2 is a block diagram showing the internal layout of an optical disc device according to an embodiment of the present invention. In FIG. 2, reference symbol 1 indicates an information storage medium such as a CD-R or CD-RW or the like, called an optical disc, which is of disc shape and capable of data recording. As shown in the figure, optical disc 1 is releasably mounted on a turntable 21 mounted at the tip of a rotary shaft of a disc motor that is provided to drive the rotation of the optical disc; data recording is performed in the mounted condition.

Reference symbol 3 in FIG. 2 indicates a pickup for performing recording or reproduction of information in respect to an information signal surface while a beam of laser light is focused on optical disc 1 that is being driven in rotation and is mounted on the turntable. This recording/reproduction means constituted by pickup 3 is mounted to be freely moveable in the radial direction of disc 1 by, for example, a guide means 4, such as a guide shaft. The interior of pickup 3 is provided with a temperature sensor 31 that comprises, for example, a temperature-sensitive resistor that detects the ambient temperature and outputs a potential level signal corresponding to the ambient temperature which is detected thereby.

In addition, in FIG. 2, reference symbol 9 indicates a disc drive circuit for drive control of disc motor 2 that drives optical disc 1 with a prescribed rotational speed. Furthermore, the tip of bottom end 32 of pickup 3 is slidably linked with a threaded shaft 51 coupled to a rotary shaft of a stepping motor 5, whereby, by controlling the rotation of stepping motor 5, pickup 3 can be moved to a prescribed position in the radial direction of optical disc 1. Further, reference symbol 7 in the figure indicates a stepping control circuit for controlling rotation of stepping motor 5 and reference symbol 8 indicates a stepping motor driver for supplying drive current of the stepping motor by the control output from stepping control circuit 7.

The temperature detection signal from temperature sensor 31 provided within pickup 3 is input to a system controller 6 together with, for example, the signal from stepping motor driver 8. System controller 6 controls the various types of operations including light emission drive of the laser diode and the position in the radial direction of pickup 3 and also controls the rotational speed of stepping motor 2 by a disc drive circuit 9.

Although not specifically shown in the drawing, as described above, in recent years, the need for portable optical disc devices has increased, particularly with the increased market demand for thinner disc devices, such as a device thickness of no more than 10 mm (for example, 9.5 mm. However, the current lower limit in design terms is about 9 mm.) As a result, the basic elementary components for constructing an optical disc device as described above, and other required components that are included therein, must be suitably arranged in a space of extremely limited thickness (i.e., narrow) of no more than 10 mm, while, on the other hand, optical disc 1, which usually has a thickness of about 1.2 mm, and is releasably mounted in the interior thereof, also has to be rotated at high speed within this narrow space (with slight clearance with respect to the various components) during recording/reproduction operation of such a thin optical disc device. Thus, the heat generated by the driver LDS, for example, which is the circuit board for controlling the drive current and laser light emission is concentrated in the interior of the optical disc device, which therefore tends to reach a high temperature, as described above.

Next, the principles of operation in particular during data recording onto an optical disc 1 in an optical disc device according to the present invention whose construction was shown diagrammatically above will be described below with reference to FIGS. 3 to 6.

Figure 3:
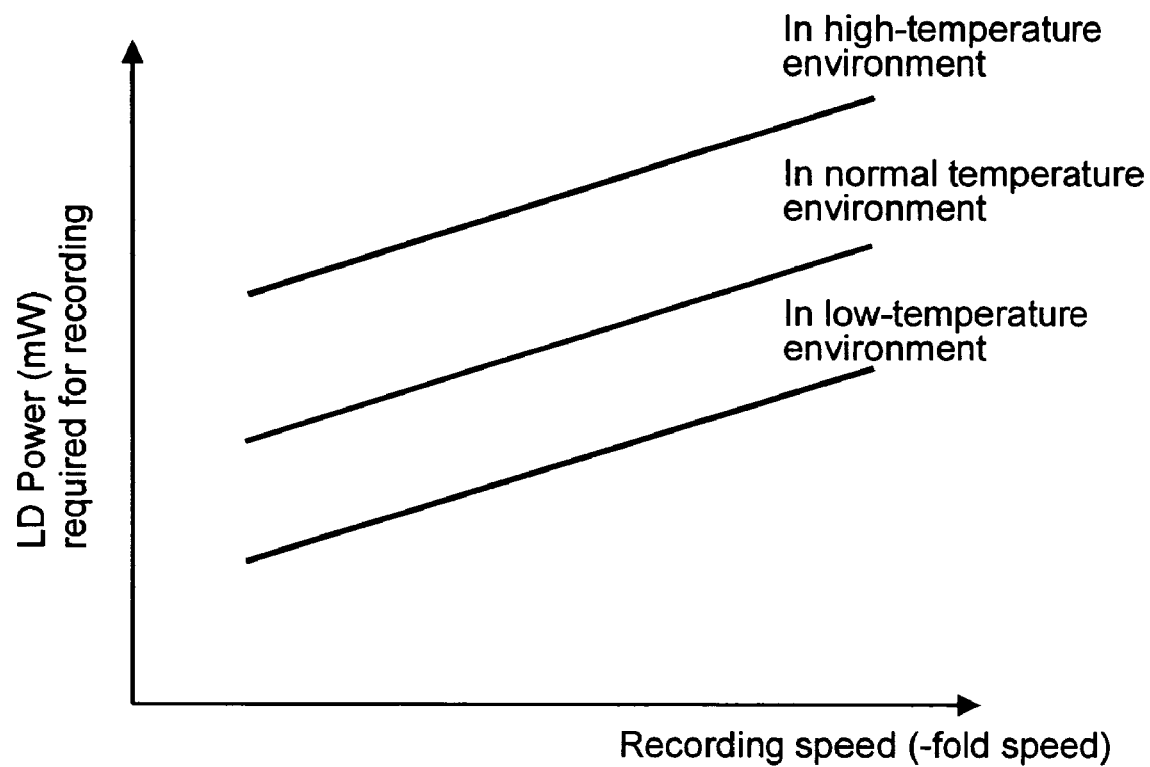
FIG. 3 is a graph showing the relationship between the recording speed and the required laser power during data recording in an optical disc device according to an embodiment of the present invention.

FIG. 3 shows the relationship between the output (power: mW) of the laser diode (LD), which is the laser-light-emitting element, in the optical disc device and the recording rate which is thereby achieved (maximum rotational speed of the disc at which recording is possible with the laser diode power in question, i.e., the so-called "fold speed"). As is clear from this graph, the power of the laser diode that is necessary for this recording operation is high in the "high-temperature environment" and is low in the "low-temperature environment." This means that, even for the same optical disc, when the optical disc device is operating in a high-temperature environment, the recording speed (x-fold speed) at which recording can be effected has to be low and, conversely, when operating in a low temperature environment, data can be reliably recorded onto the optical disc even at comparatively high recording speeds (x-fold speeds).

Figure 4:
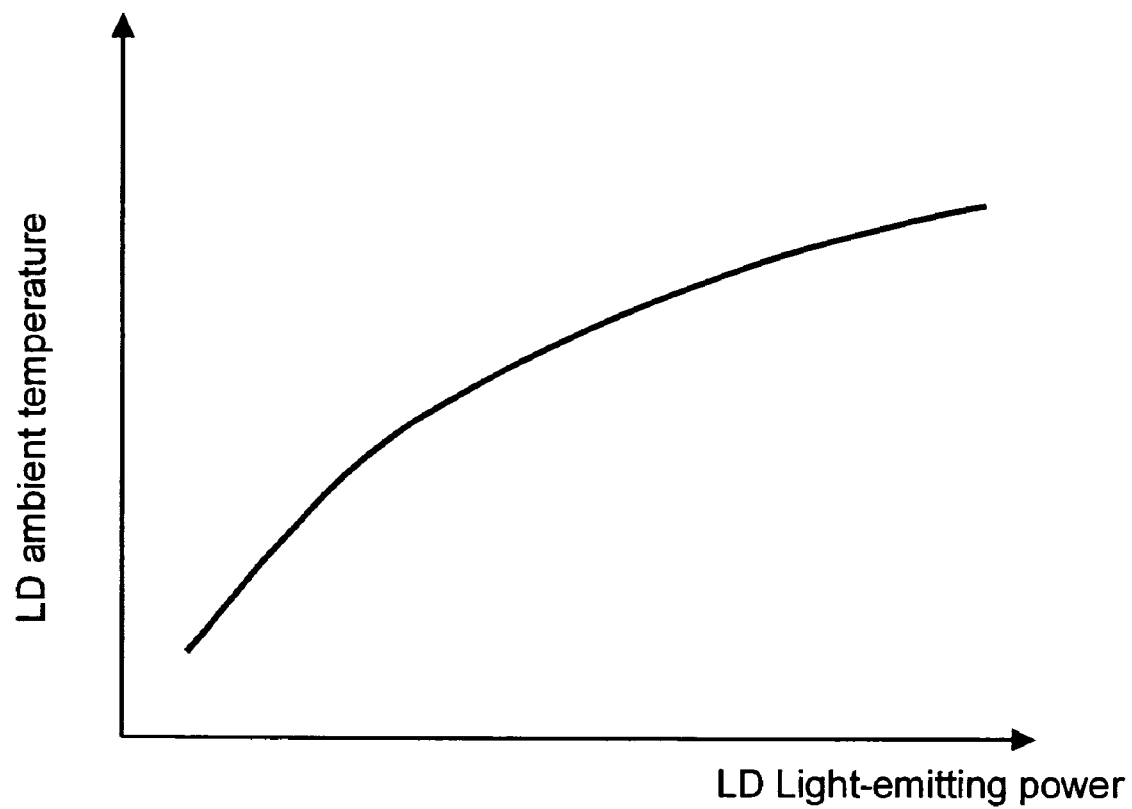
FIG. 4 is a graph showing the relationship between the light emission power and the ambient temperature during data recording in an optical disc device according to an embodiment of the present invention.

Further, FIG. 4 shows the relationship between the light emission output (power) of a laser diode (LD) as described above and the LD ambient temperature during this process. Specifically, from this graph, it can be seen that the LD ambient temperature also rises as the light emission output (power) of the laser diode (LD) rises.

In addition, as described above, in the case of an optical disc wherein data is recordable on the recording surface by an optical disc device as described above, the laser power required for data recording is different (i.e., has a sort of characteristic) depending not only, for example, on the type of media, such as CD-R or CD-RW, but also on the disc manufacturer or material or manufacturing process used to form the recording surface. This was discovered by the present inventors and the present invention was achieved on the basis of this discovery.

Figures 5, 6:
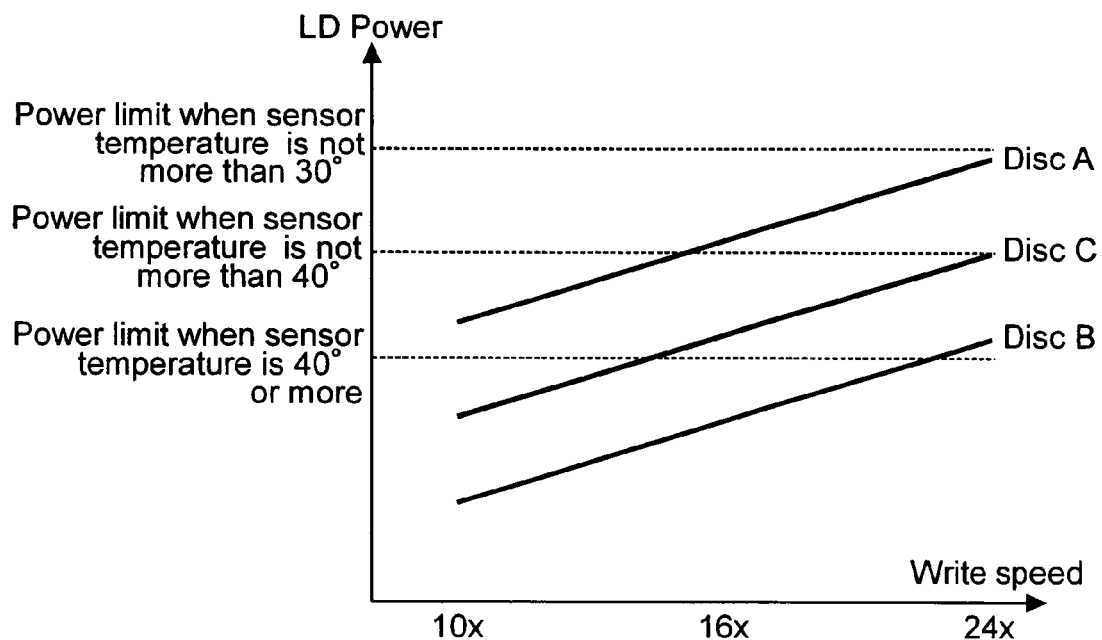
FIG. 5 is a graph showing that different data recording speeds are necessary for different types of optical discs under the same temperature conditions during data recording in an optical disc device according to an embodiment of the present invention.
FIG. 6 is a table summarizing the necessary data recording speeds for various types of optical discs, from the relationships of FIG. 5.

Specifically, as shown in FIG. 5, even for the same type of optical disc (for example CD-R), the laser power (LD power) that is necessary for writing data to multiple optical discs wherein the material used to form the recording surfaces or the manufacturing processes or other particulars are different (for example, in this case, optical discs A, B, C of different manufacturers) is respectively different. Consequently, as shown by the three different straight lines in the figure "Disc A", "Disc B" and "Disc C," although the discs share the characteristic that the required laser power for different data recording speeds (write speeds) increases as the speed increases, it can be seen that different values of laser power are required by the respective discs.

As already remarked, it should be noted that, in general, the output of a semiconductor laser such as a laser diode is limited, and there is a risk of damaging the semiconductor laser itself if laser light is output with more than the rated power. The laser output also varies depending on the ambient temperature in which the semiconductor laser is employed. Specifically, if the environment becomes high in temperature, the laser output is decreased, so the drive current must be increased. However, if an attempt is made to maintain the laser output by increasing the drive current, the drive current becomes excessive and this, of course, damages the laser-light-emitting element.

Accordingly, in the graph of FIG. 5, as shown on the laser power (LD power) axis, which is the vertical axis, the power limit that can be supplied to the laser diode has different values depending on the value of the ambient temperature (specifically, the sensor temperature, which is the signal from temperature sensor 31). In this figure, as an example, the "power limit when the sensor temperature is not more than 30°," "power limit when the sensor temperature is not more than 40°," and "power limit when the sensor temperature is 40° or more" are respectively indicated by three different horizontal lines.

Thus, in this graph of FIG. 5, the recording speed (write speed) at which data is capable of being recorded in the respective temperature regions for each optical disc, respectively matching the properties of the three types of disc ("Disc A", "Disc B", and "Disc C") referred to above, albeit these are all examples of CD-R discs, can be obtained from the points of intersection of the three straight lines ("Disc A", "Disc B", and "Disc C") referred to above with power limits in each temperature region, indicated by the three horizontal lines. A table summarizing this information is shown in FIG. 6.

Figure 1:
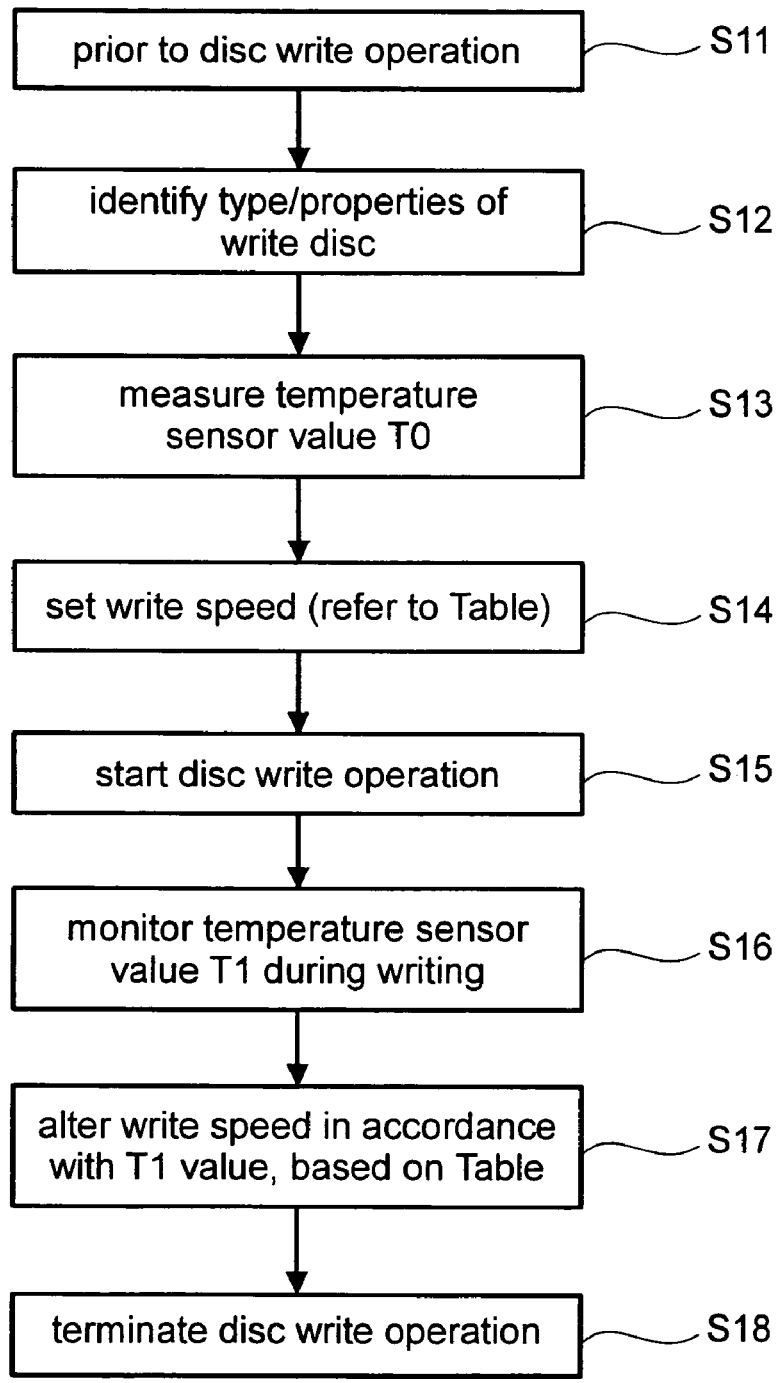
FIG. 1 is an operational flowchart showing a method of data recording in an optical disc device according to an embodiment of the present invention.

Next, the operation during data recording onto optical disc 1 in an optical disc device as described above is described with reference to the flow chart of FIG. 1. It should be noted that the operation described below is implemented by running software stored, for example, within system controller 6 comprising, for example, a CPU.

In the flow of this figure, when, for example, an optical disc 1 is mounted in the optical disc device, a check is made to ensure that the data recording operation onto optical disc 1 has not yet commenced (step S11). Next, the type and properties of the disc onto which the data is to be recorded are determined (step S12). As is clear from the above description, not only the type of optical disc that is mounted (for example, CD-R or CD-RW) but also the disc properties are determined, and this is done, for example, by using pickup 3 to read the information recorded beforehand in the region generally known as the "TOC (Table Of Contents)" at the innermost circumferential section of optical disc 1 and determining the manufacturer of the optical disc in question, which is written therein. As described above, in addition to the manufacturer of the disc, for example, information indicating the material used for forming the recording surface or the method of manufacture of the disc and, in addition, for example, the properties and type of this disc may be determined using information relating to the laser power required for the recording operation and information relating to the data recording fold speed.

Next, the temperature value detected by temperature sensor 31 is input and the temperature sensor value (T0) is measured (step S13); then the data recording speed is set (step S14) in accordance with this measured temperature sensor value (T0) and the disc type, determined above. In this process, the optimum data recording speed for optical disc 1 mounted in the device can easily be set by making use of the table shown in FIG. 6 above. (This table is pre-compiled and is stored, for example, in ROM in the optical disc device.) Specifically, after this data recording speed has been set (step S14), the device commences the data recording operation onto the optical disc (step S15). Although not shown, accompanying measurement of the temperature sensor value (step S13), system controller 6 sets the power limit value of the laser diode that is incorporated in pickup 3.

In this way, with an optical disc device according to this embodiment of the present invention, not only the optimal laser power (power limit value) is set in respect to a rise in temperature (this trend is particularly severe in optical disc devices of attenuated thickness as described above) in the environment of use, but also the optimum data recording speed is determined in accordance with the ambient temperature and the properties or type of disc, which indicate the properties during data recording of the disc. As a result, stable recording quality can always be ensured.

It should be noted that, in this embodiment, in addition, even after the data recording operation onto the optical disc by the device has commenced (step S15), in particular when the data recording operation has been running for a comparatively long time (for example, five minutes or more), the internal temperature rises during laser light emission and during drive of the pickup (this trend being particularly severe in the case of optical discs of attenuated thickness as described above), so the optimal data recording speed is suitably set while monitoring the internal temperature even after the data recording operation onto the optical disc has commenced.

More specifically, returning again to FIG. 1, temperature sensor value T1 during data recording is detected and monitored (step S16) after the lapse of a prescribed time (for example, a few seconds to a few minutes) after the commencement of the data recording operation to the optical disc (step S15). After this, in the same way as described above, the optimum data recording speed corresponding to the monitored temperature is found using the table shown in FIG. 6 and, if this value which is found is different from the value that was set in step S14, the data recording speed is altered to the optimum data recording speed which is thus found (step S17). After this, the above operation is repeated during the period of the data recording operation on the optical disc until completion thereof is ascertained, whereupon the data recording operation on the optical disc is terminated (step S18).

Next, the operation when performing data recording on an optical disc mounted in the device using an optical disc device according to the embodiment of the present invention described in detail above is described with reference to FIGS. 7 and 8.

Figure 7:
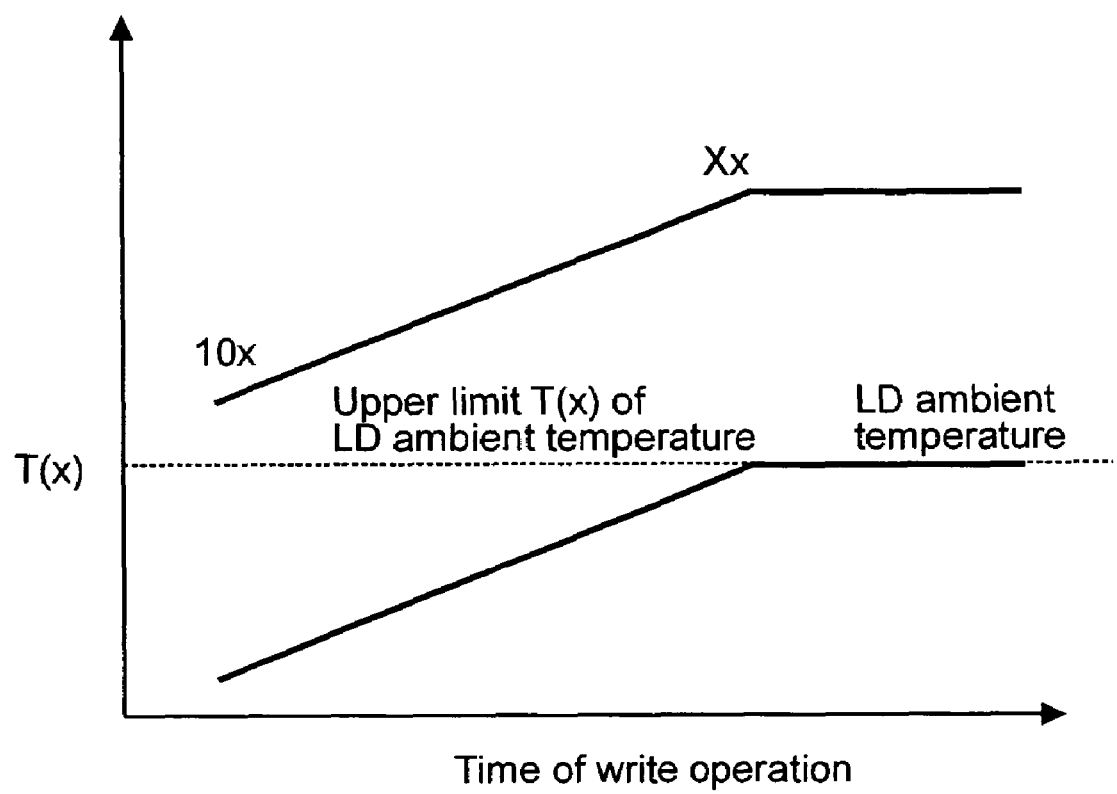
FIG. 7 is a graph showing an example regarding the data recording speed of an embodiment of the present invention.

FIG. 7 shows an example of a case in which the data recording operation is commenced with an initial 10-fold speed; in this case, the temperature within the device (LD ambient temperature) rises accompanying the laser light emission and drive of the pickup. When, as a result, the LD ambient temperature reaches the upper limiting value (T(X)) of the LD ambient temperature, the data recording speed is thereafter restricted to X-fold speed and, thus, the LD ambient temperature is also restricted to the allowable LD ambient temperature upper limiting value (T(X)).

Figure 8:
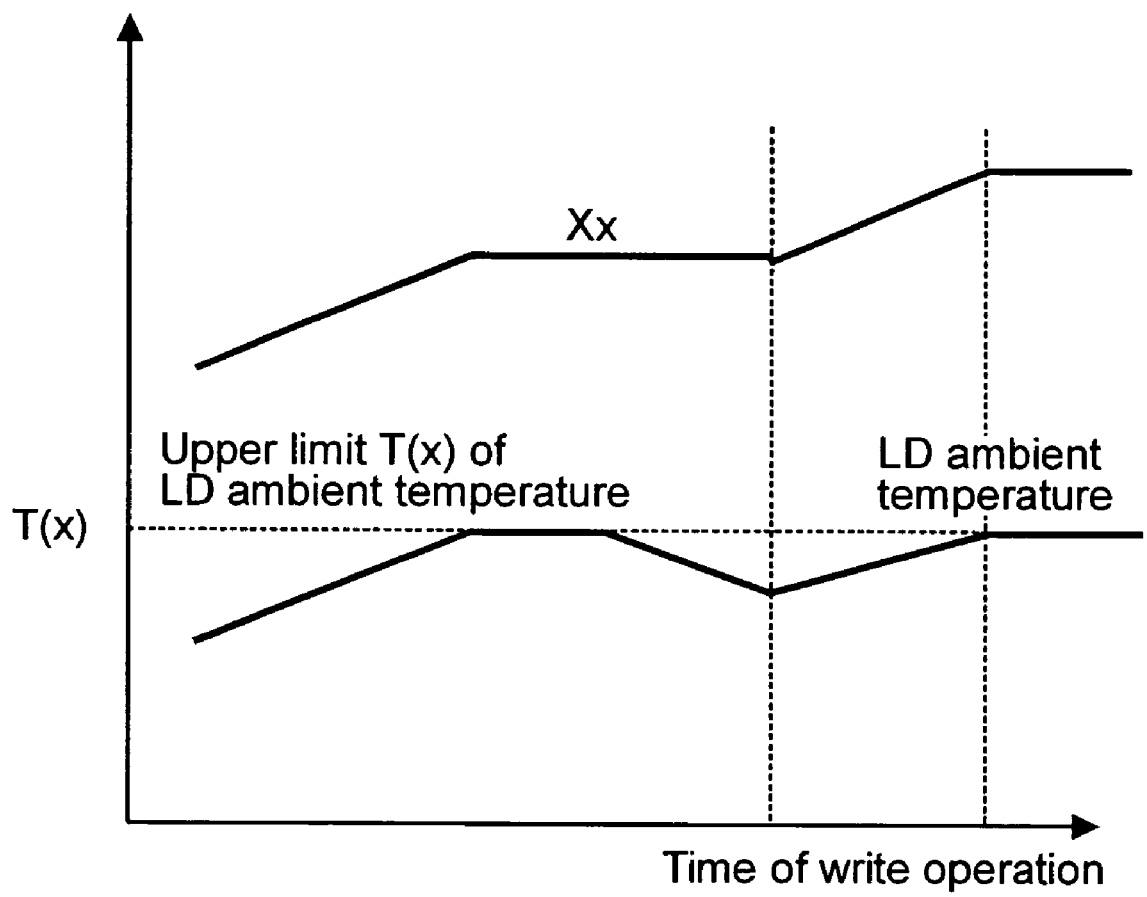
FIG. 8 is a graph showing another example regarding the data recording speed of an embodiment of the present invention.

FIG. 8 shows the operation in a case where the LD ambient temperature rises in the same way as described above to the upper limiting value (T(X)) of the LD ambient temperature and, as a result, the data recording speed is restricted to X-fold speed, but, thereafter, for some reason or other, the LD ambient temperature drops. When the LD ambient temperature drops, a data recording speed of a value exceeding the X-fold speed becomes possible, i.e., the data recording speed increases. It should be noted that when, as a result, the LD ambient temperature again rises to the upper limiting value (T(X)) of the LD ambient temperature, the data recording speed will be restricted to this value.

As described above, by detecting the data recording speed onto the optical disc not only prior to commencement of the data recording operation but also after its commencement, better optimization of control of the data recording speed with respect to the ambient temperature can be achieved, making it possible to demonstrate the maximum performance of which the optical disc device is intrinsically capable, i.e., making it possible to achieve high-quality, stable recording with high speed.

Although the embodiments in the foregoing description use a CD-R or CD-RW as the exemplary recording medium for data recording with an optical disc device according to the present invention, the present invention is not restricted solely to these media and could be applied in the same way to optical disc devices capable of recording data on optical information recording DVD discs.

What is claimed is:

1. An optical disc device comprising:
   a pickup having a semiconductor laser for providing a laser beam for recording data on an optical disc, wherein the pickup is configured to identify a type of the optical disc during execution of a recording operation on the optical disc;
   a motor configured to rotate the optical disc at a rotational speed;
   a movement mechanism configured to move the pickup in a radial direction of the optical disc;
   a system controller configured to control a data recording speed at which the recording operation is executed on the optical disc, wherein the system controller controls the data recording speed by supplying a drive current to the semiconductor laser and by controlling the rotational speed at which the motor rotates the optical disc;
   a temperature sensor configured to detect a temperature of an interior of the pickup; and
   a memory configured to store information corresponding to different types of optical discs, wherein the information comprises a data recording speed at which a recording operation is optimally executed on a particular type of optical disc based on a particular temperature of the interior of the pickup;
   wherein the system controller:
   determines the type of the optical disc on which the pickup is executing the recording operation, wherein the type of the optical disc is determined from the pickup,
   obtains a data recording speed from the memory, wherein the obtained data recording speed corresponds to the data recording speed at which a recording operation is optimally executed on the determined type of the optical disc at the temperature detected by the temperature sensor, and
   controls the drive current supplied to the semiconductor laser and controls the rotational speed at which the motor rotates the optical disc based on the obtained data recording speed such that the data recording speed at which the recording operation is executed on the optical disc is changed to the obtained data recording speed thereby continuously executing the recording operation on the optical disc.

2. The optical disc device according to claim 1, wherein the pickup determines the type of the optical disc based on information recorded in an inner circumferential section of the optical disc.

3. The optical disc device according to claim 1, wherein the memory comprises a table for storing optimal data recording speeds for the different types of optical discs based on the temperature of the interior of the pickup.

4. The optical disc device according to claim 1, wherein a thickness of the optical disc device is not greater than 10 mm.

5. The optical disc device according to claim 1, wherein the type of the optical disc comprises at least one of information regarding the manufacturer of the optical disc, information regarding the laser power needed for recording, and information regarding the rotational speed of the optical disc.

6. A method of recording data on an optical disc, the method comprising:

rotating an optical disc at a rotational speed;

executing a recording operation to record data on the optical disc by directing a laser beam onto the optical disc;

detecting a temperature of an interior region of a pickup, wherein the pickup comprises a semiconductor laser for providing the laser beam to execute the recording operation, the semiconductor laser being controlled by a drive current;

determining a type of the optical disc;

obtaining a data recording speed from a memory, wherein the obtained data recording speed corresponds to a data recording speed at which the recording operation is optimally executed on the determined type of the optical disc at the detected temperature; and controlling the drive current supplied to the semiconductor laser and controlling the rotational speed of the optical disc based on the obtained data recording speed such that the data recording speed at which the recording operation is executed is changed to the obtained data recording speed; and continuously executing the recording operation.

7. The method according to claim 6, wherein the type of the optical disc is determined based on information recorded in an inner circumferential section of the optical disc.

8. The method according to claim 6, wherein controlling the rotational speed of the optical disc is performed prior to executing the recording operation.

9. The method according to claim 6, wherein controlling the rotational speed of the optical disc is performed after executing the recording operation.

10. The method according to claim 6, wherein the type of the optical disc comprises at least one of information regarding the manufacturer of the optical disc, information regarding the laser power needed for recording, and information regarding the rotational speed of the optical disc.

* * * * *